(12) United States Patent
Tung

(10) Patent No.: US 10,789,238 B2
(45) Date of Patent: Sep. 29, 2020

(54) EVENT MANAGEMENT SYSTEMS AND EVENT TRIGGERING METHODS AND SYSTEMS THEREOF APPLIED TO A VERSION CONTROL SERVER

(71) Applicant: Wistron Corp., New Taipei (TW)

(72) Inventor: Kuang-Hao Tung, New Taipei (TW)

(73) Assignee: WISTRON CORP., New Taipei (TW)

( * ) Notice: Subject to any disclaimer, the term of this patent is extended or adjusted under 35 U.S.C. 154(b) by 667 days.

(21) Appl. No.: 15/173,430

(22) Filed: Jun. 3, 2016

(65) Prior Publication Data

US 2017/0220618 A1 Aug. 3, 2017

(30) Foreign Application Priority Data

Jan. 28, 2016 (TW) .............................. 105102638 A

(51) Int. Cl.
| | |
|---|---|
| *G06F 16/23* | (2019.01) |
| *G06F 16/22* | (2019.01) |
| *G06F 16/2455* | (2019.01) |
| *G06F 8/71* | (2018.01) |

(52) U.S. Cl.
CPC ............ *G06F 16/2329* (2019.01); *G06F 8/71* (2013.01); *G06F 16/22* (2019.01); *G06F 16/2365* (2019.01); *G06F 16/2379* (2019.01); *G06F 16/24565* (2019.01)

(58) Field of Classification Search
CPC .. G06F 16/22; G06F 16/2329; G06F 16/2365; G06F 16/2379; G06F 16/24565; G06F 8/71; G06F 9/3844
See application file for complete search history.

(56) References Cited

U.S. PATENT DOCUMENTS

| | | | | |
|---|---|---|---|---|
| 8,307,351 | B2 * | 11/2012 | Weigert ................. | G06F 21/16 717/131 |
| 8,479,161 | B2 * | 7/2013 | Weigert .............. | G06F 11/3604 717/124 |
| 9,430,229 | B1 * | 8/2016 | Van Zijst .............. | G06F 9/3844 |
| 9,575,764 | B1 * | 2/2017 | Turner ....................... | G06F 8/71 |
| 9,898,393 | B2 * | 2/2018 | Moorthi ................ | G06F 11/368 |
| 10,289,407 | B1 * | 5/2019 | Turner ...................... | G06F 8/71 |
| 2013/0152047 | A1 * | 6/2013 | Moorthi ................ | G06F 11/368 717/124 |

OTHER PUBLICATIONS

Jon Loeloger, "Version Control with Git," Copyright © 2009; Published by O'Reilly Media, Inc (Year: 2009).*
Jon Loeliger, "Version control with Git," Published by O'Reilly Media, Inc., 1005 Gravenstein Highway North, Sebastopol, CA 95472 (Year: 2009).*

* cited by examiner

*Primary Examiner* — Ashish Thomas
*Assistant Examiner* — Mellissa M. Ohba

(57) ABSTRACT

An event triggering method includes the following steps. First, it is detected whether a version control command received from the version control server is a commit command. In response to detecting that the version control command is the commit command, the commit command is decoded to obtain a comment string and the comment string is compared with at least one predetermined string to determine whether they are matched, wherein the predetermined string corresponds to a predetermined event. In response to determining that the comment string and the comment string are matched, triggering of the predetermined event corresponding to the predetermined string is being performed.

5 Claims, 7 Drawing Sheets

Table1

| Number Code for first-level strings | Description | Reference object |
|---|---|---|
| 1 (A) | Describe scenarios corresponding to the collection "A" | Collection "A" of the first letter "A" {Alarm, Alert,...} |
| 2 (B) | Describe scenarios corresponding to the collection "B" | Collection "B" of the first letter "B" {Boot,...} |
| 3 (C) | Describe scenarios corresponding to collection "C" | Collection "C" of the first letter "C" {Clear,...} |
| 4 (D) | Describe scenarios corresponding to the collection "D" | Collection "D" of the first letter "D" {Debug,...} |
| .... | .... | .... |
| 12 (L) | Describe scenarios corresponding to the collection "L" | Collection "L" of the first letter "L" {Launch,...} |
| .... | .... | .... |

FIG. 3A

Table2

| Number code for second-level | Description | Reference object |
|---|---|---|
| 1 (A) | Describe event actions corresponding to the collection "A" | Collection "A" of the first letter "A" |
| 2 (B) | Describe event actions corresponding to the collection "B" | Collection "B" of the first letter "B" |
| 3 (C) | Describe event actions corresponding to the collection "C" | Collection "C" of the first letter "C" |
| 4 (D) | Describe event actions corresponding to the collection "D" | Collection "D" of the first letter "D" |
| .... | .... | .... |
| 21 (U) | Describe event actions corresponding to the collection "U" | Collection "U" of the first letter "U" { User manager, UI/GUI, Update device,... } |
| .... | .... | .... |
| 26 (Z) | Describe event actions corresponding to the collection "Z" | |

FIG. 3B

Table3

| Code for third-level strings | Description | Connected action |
|---|---|---|
| User manager | Trigger User_manager event with parameters value and string | User_manager (value, string) |
| UI/GUI | Trigger UI_GUI event with parameter value | UI_GUI(value) |
| Update device | Trigger Update_device event with parameters value and device_string | Update_device (value, device_string) |
| User Feedback | Trigger "User Feedback" event | Script echo bala bala bala |
| .... | .... | .... |

FIG. 3C

EVENT MANAGEMENT SYSTEMS AND EVENT TRIGGERING METHODS AND SYSTEMS THEREOF APPLIED TO A VERSION CONTROL SERVER

CROSS REFERENCE TO RELATED APPLICATIONS

This Application claims priority of Taiwan Application No. 105102638, filed on Jan. 28, 2016, and the entirety of which is incorporated by reference herein.

BACKGROUND OF THE INVENTION

Field of the Invention

The invention generally relates to event triggering technology, and more particularly, to event management systems and event triggering methods thereof applicable to a version control system.

Description of the Related Art

The version control system is a powerful and essential tool. The basic concept of the version control system is to store revised records in the central server. In the engineer's workplace is a copy under revision by an engineer. The version control system allows many engineers to revise the same file at the same time, and it can prevent version conflicts. Through the Internet and the version control system, engineers scattered from all over the world can conveniently form work teams and work together.

Git is a commonly distributed version control software program. Many well-known software programs use Git to carry out version control, including the development process of Linux kernel and other projects. During development, engineers usually wait until all the Git software programs are uploaded by everyone at the end of a work day to begin testing/event launch, etc., and system testing/event launch after each version control usually takes up the majority of the time, which is not only time-consuming but also cumbersome. In addition, there is no shared platform or contents that can be immediately controlled to examine. It is also possible that engineers can only conduct testing in the environment they established. This may result in omissions of important settings due to the established environment's disparity with the actual environment, thus affecting the development time histories.

In addition, Git can generally be used to conduct version control or sharing, but it is deficient of other features such as automatic event triggering, and so on.

Therefore, it is a desire to have management systems and related methods capable of providing automatic event triggering for use in a version control system such as the Git system.

BRIEF SUMMARY OF THE INVENTION

Event management systems and event triggering methods and systems thereof are provided.

An embodiment of the invention provides an event triggering method for use in an event management system which is coupled to a version control server. The method includes the following steps. First, it is detected whether a version control command received from the version control server is a commit command. In response to detecting that the version control command is the commit command, the commit command is decoded to obtain a comment string and the comment string is compared with at least one predetermined string to determine whether they are matched, wherein the predetermined string corresponds to a predetermined event. In response to determining that the comment string and the comment string are matched, triggering of the predetermined event corresponding to the predetermined string is being performed.

Another embodiment of the present invention provides an event management system coupled to a version control server, comprising a monitoring module, a comparison module and an event processing module. The monitoring module is coupled to the version control server for detecting whether a version control command received from the version control server is a commit command. The comparison module is coupled to the monitoring module for decoding the commit command to obtain a comment string in response to detecting that the version control command is the commit command and comparing the comment string with at least one predetermined string to determine whether the comment string and the at least one predetermined string are matched, wherein the predetermined string corresponds to a predetermined event. The event processing module is coupled to the comparison module for triggering the predetermined event corresponding to the predetermined string when the comparison module determines that the comment string and the at least one predetermined string are matched.

Yet another embodiment of the present invention provides a system, comprising at least one client for providing a version control command, a version control server and an event management system. The version control server is coupled to the at least one client for performing a version control operation corresponding to the client in response to the version control command sent by the client. The event management system is coupled to the version control server for detecting whether a version control command received from the version control server is a commit command, decoding the commit command to obtain a comment string in response to detecting that the version control command is the commit command and comparing the comment string with at least one predetermined string to determine whether the comment string and the at least one predetermined string are matched and triggering a predetermined event corresponding to the predetermined string in response to determining that the comment string and the at least one predetermined string are matched.

Methods may be practiced by the disclosed apparatuses or systems which are suitable firmware or hardware components capable of performing specific functions. Methods may also take the form of a program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF DRAWINGS

The invention can be more fully understood by reading the subsequent detailed description and examples with references made to the accompanying drawings, wherein:

FIGS. 3A to 3C are schematic diagrams respectively illustrating embodiments of a first table, a second table and a third table of the invention;

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
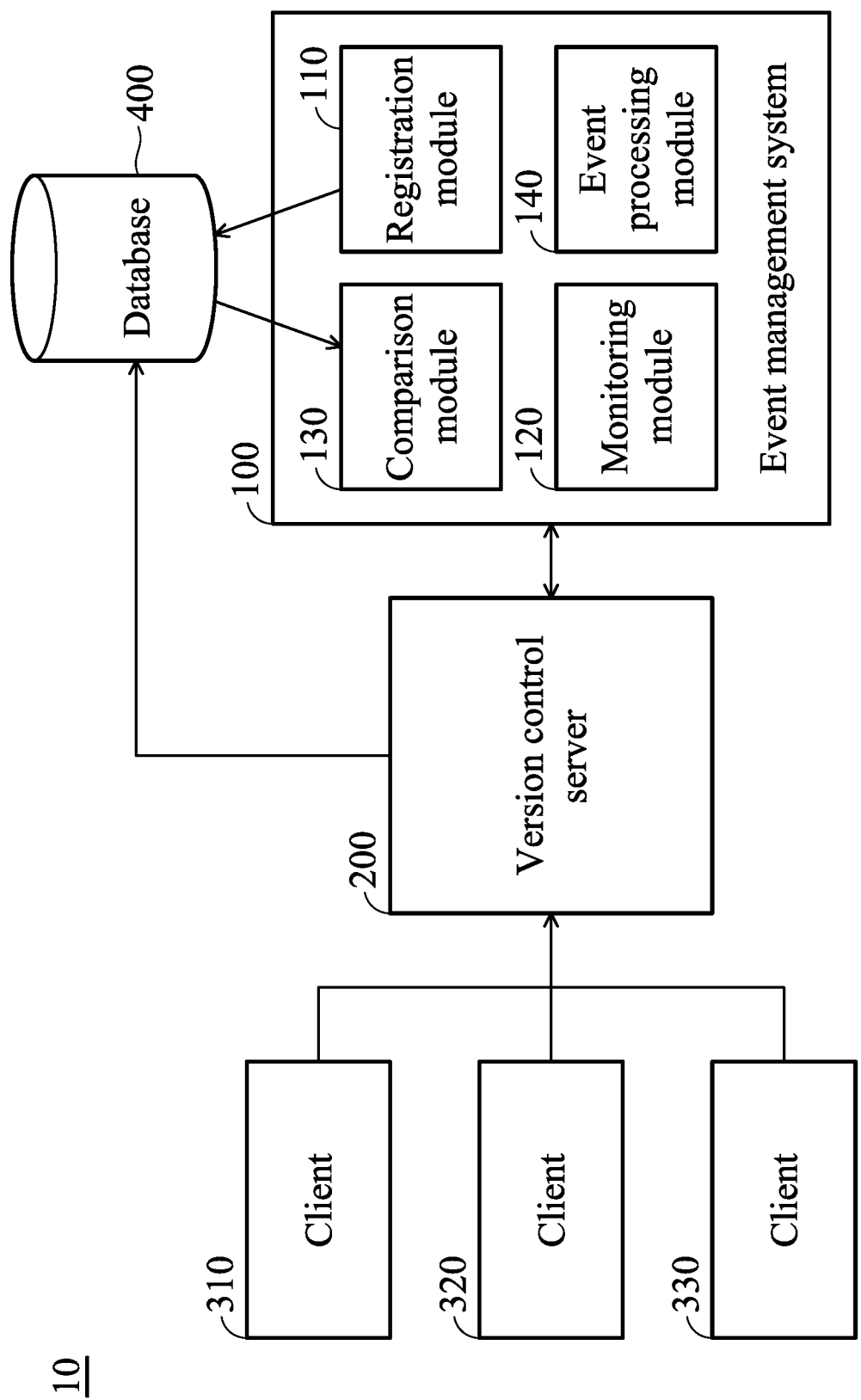
FIG. 1 is a schematic diagram illustrating an embodiment of an event management system of the invention.

FIG. 1 is a schematic diagram illustrating an embodiment of a system including an event management system of the invention. As shown in FIG. 1, the system 10 may at least include an event management system 100, a version control server 200 and one or more clients 310, 320 and 330, wherein the version control server 200 is coupled to the client 310, 320 and 330 to provide software version control for users of the client 310, 320 and 330 so as to the version of software uploaded by the users. The users of the client 310, 320 and 330 can handle each variation in software version between each other by using a version control command, such as an updating command. Specifically, the event management system 100 and the client 310, 320 and 330 are coupled to the version control server 200 over a connected communication network (not shown) (e.g., any wired/wireless communication networks, such as the Internet, 3G, and/or WLAN network, etc. . . . ) so that the client 310, 320 and 330 can send a variety of released version control commands to the version control server 200, and the event management system 100 may monitor the version control commands received by the version control server 200.

For example, the version control server 200 can be any known distributed version control system, such as Git, Mercurial, Bazaar, Dares and other servers, but it is not limited thereto.

The event management system 100 which is coupled to the version control server 200 and the database 400 can perform the event triggering method of the present invention, which will be discussed further in the following paragraphs.

The event management system 100 may include at least one registration module 110, a monitoring module 120, a comparison module 130 and an event processing module 140, wherein the registration module 110 is coupled to the database 400 to provide users to register new strings and to generate a number of string tables of the invention required to be stored in the database 400 according to the registered content. Related table contents will be discussed further in the following paragraphs.

The monitoring module 120 is coupled to the version control server 200 and the comparison module 130 for monitoring information of the version control server 200 and informing the comparison module 130 when detecting specific information. The comparison module 130 is coupled to the database 400, the monitoring module 120 and the event processing module 140 for analyzing whether the information received from the version control server 200 by the monitoring module 120 contains a predetermined string based on the registration information in the database 400 and in response to determining that the information contains the predetermined string, generating a notification to the event processing module 140 according to definition for the predetermined string contained. The event processing module 140 may trigger the given event corresponding to the aforementioned predetermined string when receiving the aforementioned notification. It should be appreciated that the registration module 110, the monitor module 120, the comparison modules 130, and the event processing module 140 may be implemented by hardware modules with appropriate software and hardware circuits to achieve each of its corresponding functionalities and operations.

In some embodiments, each predetermined string may further include a first index string, a second index string and a third index string. The said first, second and third index strings can be all defined in one table. However, the search and comparisons may spend considerable amounts of time, thus reducing computation performance.

In order to resolve the time-consuming search and comparison problems mentioned above that result in reduced computation performance, in some implementation cases, the predetermined strings are defined in a hierarchical manner. In particular, every predetermined string can include one first index string, one second index string, and one third index string. Among them, the first index string is defined in a first table; the second index string is connected/linked to the first index string, which is the sub-string of the first index string and is defined in a second table; and the third index string is connected/linked to the second index string, which is the sub-string of the second index string and is defined in a third table.

Figure 2:
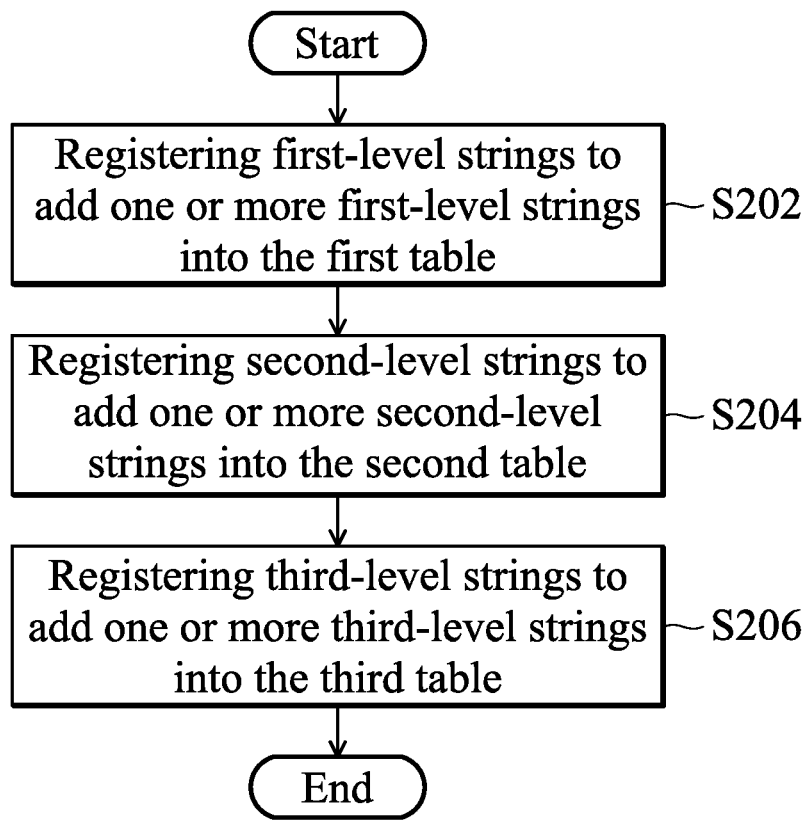
FIG. 2 is a flowchart of an embodiment of a method for registering predetermined strings of the invention.

FIG. 2 is a flowchart of an embodiment of a method for registering predetermined strings of the invention for registering a predetermined string. The method can be applied to the event management system 100 as shown in FIG. 1 and performed by the registration module 110 as shown in FIG. 1.

In step S202, the user may register the first-level (or level 1) string to the registration module 110. When the registration module 110 receives one or multiple first-level strings to be registered, one or multiple registered first-level strings will be added to the first table, as shown in table Table 1 illustrated in FIG. 3A. The registration module 110 can store "L" of content Launch to the database 400 and establish "U" in another content User Manager through the reference approach used in its rear-end parameter Value. Using the same numbers to represent the corresponding English letters saves time on cross matching letters, which can facilitate the comparison module 130 to more quickly search strings needed later.

Referring to FIG. 3A, which is a schematic diagram illustrating an embodiment of a first table of the invention for storing first-level strings. As shown in FIG. 3A, table Table 1 contains records of all the defined or registered first-level strings. The table Table 1 contains at least fields 1, 2, and 3. Among them, field 1 is used to represent the number code corresponding to the first letter of the first-level string. For example, the number code corresponding to the first letter "A" is "1", the number code corresponding to the first letter "B" is "2" and so forth. Field 2 is the description field, which is used to describe possible scenarios corresponding to the same first letter in the first-level string. Field 3 is the reference object field, which is used to connect/link a collection of same first letters among the first-level strings to provide related second-level string indexes. For example, in this embodiment, the registration module 110 can store the first-level string "Launch" in the "L" collection and store it into the database 400. Then, a corresponding second-level string, e.g., the collection of "U" in User Manager, is established using the reference approach in its rear-end parameter Value to facilitate the comparison module 130 to more quickly search strings needed later.

For example, as shown in Table 1 of FIG. 3A, a collection of the first letter "A" of the first-level strings may include "Alarm", "Alert" and so on, and a collection of the first letter "B" of the first-level strings may include "Boot" and so on, a collection of the first letter "L" of the first-level strings may include "Launch" and so on, but the invention is not limited thereto.

In step S204, the user may register the second-level (or level 2) string to the registration module 110. When the registration module 110 receives one or multiple second-level strings to be registered, one or multiple registered second-level strings will be added to the second table, as shown in table Table 2 illustrated in FIG. 3B.

Referring to FIG. 3B, which is a schematic diagram illustrating another embodiment of a second table of the invention for storing second-level strings. As shown in FIG. 3B, table Table 2 contains records of all the defined or registered second-level strings. The table Table 2 contains at least fields 1, 2, and 3. Among them, field 1 is used to represent the number code corresponding to the first letter of the second-level string. For example, the number code corresponding to the first letter "A" is "1", the number code corresponding to the first letter "B" is "2" and so forth. Field 2 is the description field, which is used to describe event actions corresponding to the same first letter in the second-level string. Field 3 is the reference object field, which is used to connect/link a collection of same first letters among the second-level strings to provide related third-level string indexes. For example, in this embodiment, the registration module 110 can store the second-level string "Update_device" in the "U" collection and store it into the database 400. Then, a corresponding third-level string, e.g., the collection of "U" in Update_device, is established using the reference approach in its rear-end parameter Value to facilitate the comparison module 130 to more quickly search strings needed later.

For example, as shown in Table 2 of FIG. 3B, a collection of the first letter "U" of the second-level strings may include "User manager", "UI/GUI", "Update device" and so on, but the invention is not limited thereto.

In step S206, the user may register the third-level (or level 3) string to the registration module 110. When the registration module 110 receives one or multiple third-level strings to be registered, one or multiple registered third-level strings will be added to the third table, as shown in table Table 3 illustrated in FIG. 3C.

Referring to FIG. 3C, which is a schematic diagram illustrating another embodiment of a third table of the invention for storing third-level strings. As shown in FIG. 3C, table Table 3 contains records of all the defined or registered third-level strings. The table Table 3 contains at least fields 1, 2, and 3. Among them, field 1 is used to represent a collection of first letters "U" among the third-level strings, such as "User manager", "UI/GUI", "Update device" and so on. Field 2 is the description field, which is used to describe trigger event and related actions represented by the third-level string. Field 3 is a connection action field, which is used to connect/link to the event processing module 140 to inform the event processing module 140 to activate proper application programming interface (API) to perform the trigger event and related actions represented by the third-level string. Users can add third-level strings and corresponding events for library functions they required according to their needs. For example, these events may include controlling device, integration testing, end-user software updating and other events, but the invention is not limited thereto. For example, in this embodiment, the registration module 110 can store the third-level string "Update_device (value, string)" in the "U" collection of the Table 3 and store it into the database 400 and record that a Update_device event is to be triggered with parameters value and device_string when a string "Update_device (value, device_string)" has received to represent that the connection action to the event processing module 140 is "Update_device (value, device_string)", but the invention is not limited thereto.

After the Table 1, Table 2 and Table 3 as shown in FIGS. 3A to 3C respectively have been generated in advance and saved to the database 400 via the registration module 110, the comparison module 130 can determine whether to trigger a specific event based on these tables.

Figure 4:
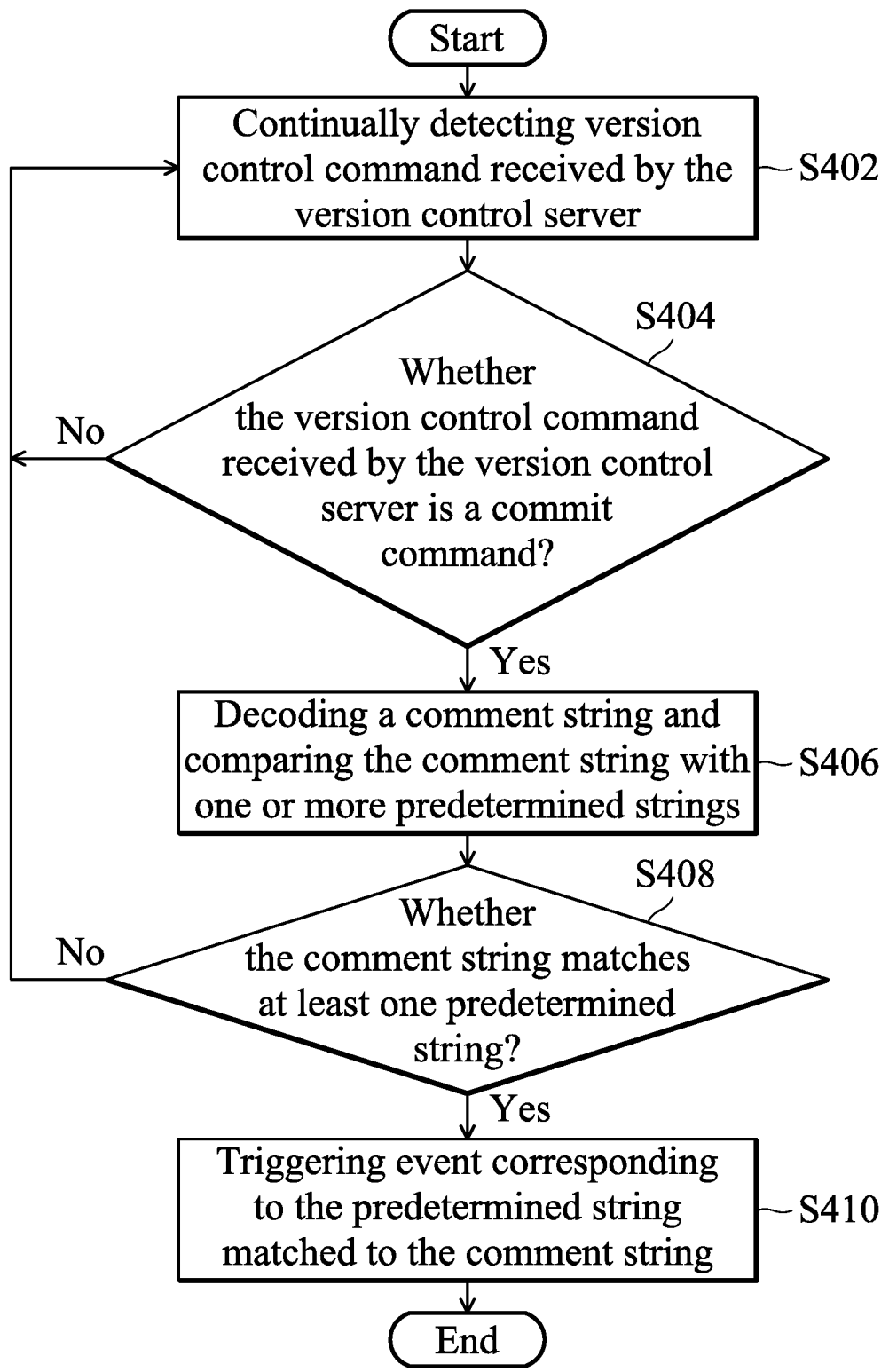
FIG. 4 is a flowchart of an embodiment of an event triggering method of the invention.

FIG. 4 is a flowchart of an embodiment of an event triggering method of the invention for determining whether to trigger a specific event. The event triggering method can be applied to the event management system 100 as shown in FIG. 1.

In step S402, the monitoring module 120 of the event management system 100 continuously monitors version control commands received by the version control server 200 and in step S404, determines whether the version control command received by the version control server 200 is a commit command. If not, the flow returns to step S402, and the monitoring module 120 continues to detect whether there is a version control command. To be more specific, the monitoring module 120 may retrieve information from the version control server 200 (e.g., a Git server) according to a predetermined time period set by the users and filters out whether the version control command received by the version control server 200 is a commit command.

When it is determined that the version control command received by the version control server 200 is the commit command (Yes in step S404), in step S406, the comparison module 130 of the event management system 100 decodes a comment string from the commit command and then compares the comment string with one or more predetermined strings.

In step S408, the comparison module 130 determines whether the decoded comment string matches at least one predetermined string. Specifically, the comparison module 130 compares decoded comment string with specific strings registered in the database 400 to determine whether there is a matched specific predetermined string for the decoded comment string, wherein each predetermined string can be used to trigger a predetermined event.

In some embodiments, the comment string further includes a first parameter, a second parameter and a third parameter, and each predetermined string includes a first index string, a second index string and a third index string. Then, the step of comparing the decoded comment string with predetermined strings registered in the database 400 to determine whether there is a matched specific predetermined string for the decoded comment string may further include the following steps. First, it is compared whether the first parameter matches the first index string. When the first parameter does not match the first index string, it means that the first parameter is not defined and it is determined that the comment string does not match the predetermined string. It may represent that the comparison is failure, and the comment string is not a special string. When the first parameter matches with the first index string, it represents that the first level comparison passes and then it is compared whether the second parameter matches the second index string. When the second parameter does not match the second index string, it means that the second parameter is not defined and it is determined that the comment string does not match the predetermined string. It may represent that the comparison is failure, and the comment string is not a special string. When the second parameter matches with the second index string, it represents that the second level comparison passes and then it is compared whether the third parameter matches the third index string. When the third parameter does not match the third index string, it means that the third parameter is not defined and it is determined that the comment string does not match the predetermined string. It may represent that the comparison is failure, and the comment string is not a special string. When the third parameter matches with the third index string, it represents that the third level comparison passes and thus it is determined that the comment string matches the predetermined string. By way of hieratical comparisons can quickly distinguish whether it is a registered string or not, thereby improving the performance of comparison operations and reducing the time required for comparison.

When the comparison module 130 of the event management system 100 determines that the comment string does not comply with any predetermined string (NO in step S408), it means there is no need to trigger any predetermined event, then the flow returns to step S402, in which the monitoring module 120 continues to detect whether there is another version control commands. Contrarily, when the comparison module 130 of the event management system 100 determines that the comment string matches at least one predetermined string (Yes in step S408), in step S410, the comparison module 130 of the event management system 100 sends a notification to inform the event processing module 140 to trigger the event corresponding to the predetermined string matched to the comment string, so the event processing module 140 can trigger the event corresponding to the predetermined string that is matched to the comment string and perform actions corresponding to the event being triggered.

For example, the comparison module 130 of the event management system 100 may send a notification with "User manager (value, string)" to the event processing module 140 to enable the event processing module 140 to trigger user-defined events. In another embodiment, the comparison module 130 of the event management system 100 send a notification with "Update Device" to the event processing module 140, such as "Update_device (Ture, 0xFA76E21AV)", to turn on or off the control device end.

When the event processing module 140 receives the abovementioned notification sent from the comparison module 130, designated events in the notification are commended, such as a User Manager event launches. When the event processing module 140 receives a notification "Update_device(True, 0xFA76E21AV)", the event processing module 140 will correspond to the Boolean value "True" and device code "0xFA76E21AV" in the abovementioned update device notification to turn on the device with the device code of "0xFA76E21AV. Similarly, when the event processing module 140 receives a notification "Update_device(False, 0xFA76E21AV)", the comparison module 130 will correspond to the Boolean value "False" and device code "0xFA76E21AV" to turn off or shut down the device with the device code "0xFA76E21AV".

Figure 5:
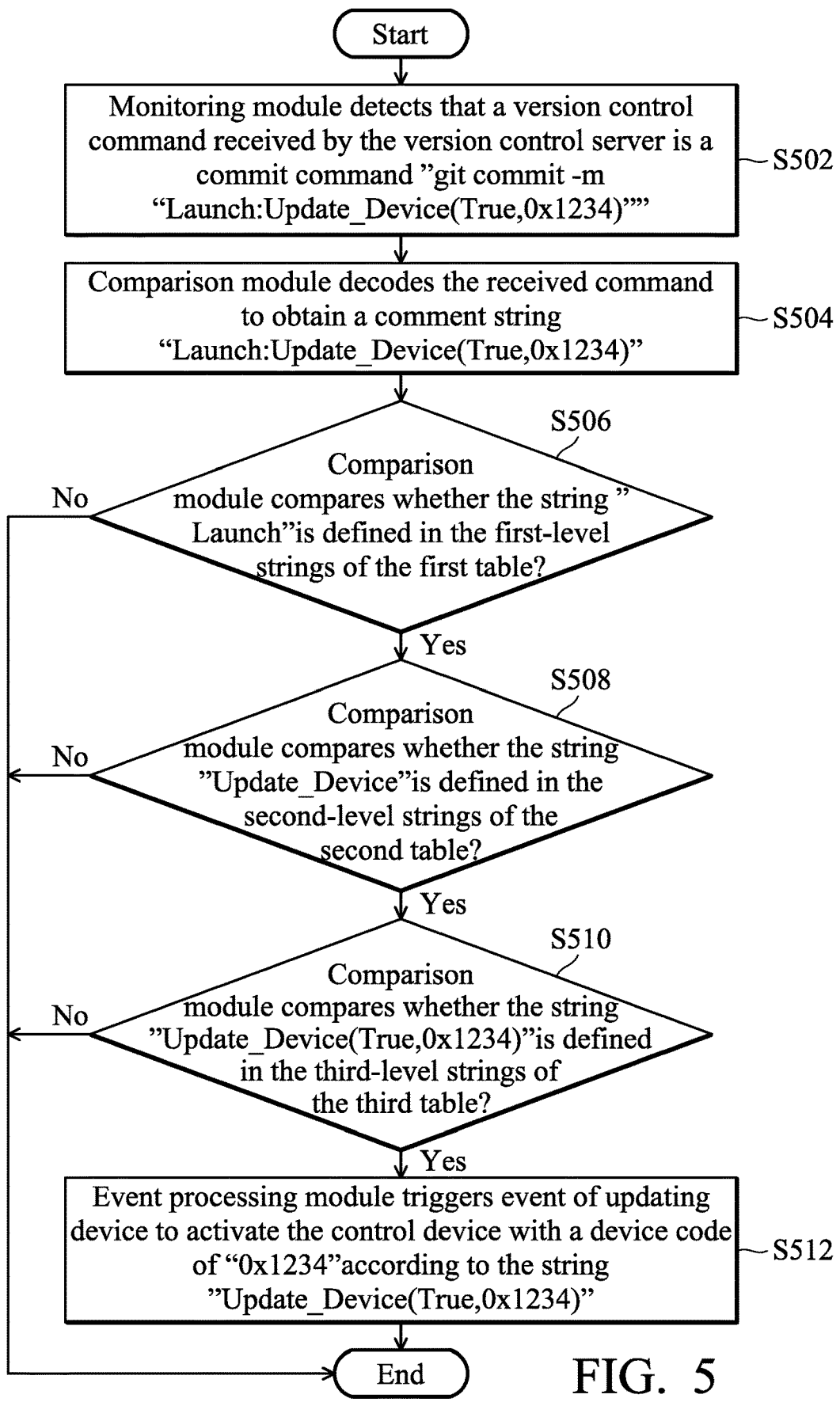
FIG. 5 is a flowchart of another embodiment of an event triggering method of the invention.

For example, referring to FIG. 5, FIG. 5 is a flowchart of another embodiment of an event triggering method of the invention for determining whether to trigger a specific event. The event triggering method can be applied to the event management system 100 as shown in FIG. 1. In this embodiment, it is assumed the version control server 200 is a Git server and the commit command is a Git commit command corresponding to the Git server. Additionally, the tables Table 1, Table 2 and Table 3 as shown in FIGS. 3A through 3C has been previously generated and saved to the database 400 via the registration module 110 to be used by the comparison module 130 for subsequent comparisons. Conventionally, when the user of the client 300 needs to update released version information or update software, a Git commit command is first issued to the Git server to write comment for this updated contents and a Git push command is then be issued to update the software on the Git server. In this embodiment, the event management system 100 can continually monitor whether the Git server has received a Git commit command issued from the user and then determine whether to trigger any predetermined event.

When the monitoring module 120 detects a version control command received by the version control server (i.e., the Git server) is the commit command "git commit -m" Launch: Update_Device (True, 0x1234) "(step S502), it informs the comparison module 130 to prepare performing a defined string matching procedure. The comparison module 130 then decodes the Git commit command to obtain a comment string "Launch:Update_Device (True, 0x1234)" (step S504). Specifically, the comparison module 130 can divide this comment string into a first parameter "Launch", a second parameter "Update_Device" and a third parameter "Update_Device (True, 0x1234)". Each predetermined string can include a first index string, a second index and a third index string, wherein the first index string is defined in the first table Table 1; the second index string is connected/linked to the first index string, which is the sub-string of the first index string and is defined in the second table Table 2; and the third index string is connected/linked to the second index string, which is the sub-string of the second index string and is defined in the third table Table 3.

The comparison modules 130 first compares whether the string "Launch" is defined in the first-level strings of the first table (e.g., the table Table 1 as shown in FIG. 3A). In this embodiment, as the string "Launch" has already defined in the first table Table 1, the first level string comparison passes and thus the comparison module 130 further compares whether the string "Update_Device" is defined in the second-level strings of the second table (e.g., the table Table 2 as shown in FIG. 3B). Similarly, in this embodiment, as the string "Update_Device" has already defined in the table Table 2, the second level string comparison passes and thus the comparison module 130 further compares whether the string "Update_Device(True,0x1234)" is defined in the third-level strings of the third table (e.g., the table Table 3 as shown in FIG. 3C). Similarly, in this embodiment, as the string "Update_Device(True,0x1234)" has already defined in the table Table 3, the third level string comparison passes and the comparison module 130 determines that the comment string is one of the predetermined strings and sends a notification indicating that the user requests to trigger specific event to the event processing module 140. Thus, the event processing module 140 triggers event of updating device to activate or turn on the control device (e.g., a phone under test) with a device code of "0x1234" according to definition of the string "Update_Device(True,0x1234)". Similarly, when the user wants to trigger another event of updating device to deactivate or turn off the control device with the device code of "0x1234", the user can simply submit a commit command "git commit -m" Launch: Update_Device (False, 0x1234) "to the Git server to control the event processing module 140 performs related operations to deactivate or turn off the control device with the device code of "0x1234".

Therefore, the event management systems and related event triggering methods of the present invention can provide the function of adding a comment string to the commit command of the version control server, which can automatically analyze the strings behind the commit commands and send out a notification for executing a triggered corresponding event when a predefined special string is encountered, thus enabling the event processing module to execute events being triggered and corresponding actions. The setting and installation of the version control server need not be changed, while easily achieving the purpose of testing/integrating/adding conditions that need to be launched by designated actions of relevance after software version uploaded and updated, which can effectively provide time flexibility during development process and reduce doubts over the environment in which a launch is made, thereby effectively and quickly performing development and event triggering.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An event triggering method for use in an event management system coupled to a version control server and a database storing at least one predetermined string, the method comprising:
    detecting whether a version control command received from the version control server is a commit command;
    in response to detecting that the version control command is the commit command, decoding the commit command to obtain a comment string and comparing the comment string with the at least one predetermined string to determine whether the comment string and the at least one predetermined string are matched, wherein the predetermined string corresponds to a predetermined event; wherein the predetermined event at least comprises activating or deactivating at least one control device; and
    triggering the predetermined event corresponding to the predetermined string in response to determining that the comment string and the at least one predetermined string are matched;
    wherein the comment string further comprises a first parameter, a second parameter and a third parameter and the predetermined string further includes a first index string, a second index string and a third index string, and the method further comprising:
    providing a first table, a second table and a third table to store the first index string, the second index string and the third index string, respectively;
    wherein the second index string is connected/linked to the first index string and is a sub-string of the first index string and the third index string is connected/linked to the second index string and is the sub-string of the second index string;
    wherein the step of comparing the comment string with the at least one predetermined string to determine whether the comment string and the at least one predetermined string are matched further comprises:
    comparing the first parameter and the first index string to determine whether the first parameter and the first index string are matched;
    determining the comment string and the at least one predetermined string are not matched when the first parameter and the first index string are not matched;
    comparing the second parameter and the second index string to determine whether the second parameter and the second index string are matched when the first parameter and the first index string are matched;
    determining the comment string and the at least one predetermined string are not matched when the second parameter and the second index string are not matched;
    comparing the third parameter and the third index string to determine whether the third parameter and the third index string are matched when the second parameter and the second index string are matched;
    determining the comment string and the at least one predetermined string are not matched when the third parameter and the third index string are not matched; wherein when the third parameter and the third index string are not matched, the third parameter is not defined and the comment string does not match the predetermined string, the step of comparing the comment string is failure, and the comment string is not a special string; and
    determining the comment string and the at least one predetermined string are matched when the third parameter and the third index string are matched.

2. The event triggering method of claim 1, wherein the version control server is a Git server and the commit command is a Git commit command corresponding to the Git server.

3. An event management system coupled to a version control server, comprising
    a monitoring module comprising a first hardware circuit coupled to the version control server and configured to detect whether a version control command received from the version control server is a commit command;
    a comparison module comprising a second hardware circuit coupled to the monitoring module and configured to decode the commit command to obtain a comment string in response to detecting that the version control command is the commit command and comparing the comment string with at least one predetermined string to determine whether the comment string and the at least one predetermined string are matched, wherein the predetermined string corresponds to a predetermined event;
wherein the predetermined event at least comprises activating or deactivating at least one control device;
an event processing module comprising a third hardware circuit coupled to the comparison module and configured to trigger the predetermined event corresponding to the predetermined string when the comparison module determines that the comment string and the at least one predetermined string are matched; and
a database;
wherein the comment string further comprises a first parameter, a second parameter and a third parameter and the predetermined string further includes a first index string, a second index string and a third index string;
a registration module comprising a fourth hardware circuit coupled to the database and configured to store the predetermined string in the database by providing a first table, a second table and a third table in the database for storing the first index string, the second index string and the third index string, respectively;
wherein the second index string is connected/linked to the first index string and is a sub-string of the first index string and the third index string is connected/linked to the second index string and is the sub-string of the second index string, and the comparison module is further configured to compare the comment string with the at least one predetermined string to determine whether the comment string and the at least one predetermined string are matched by:
comparing the first parameter and the first index string to determine whether the first parameter and the first index string are matched;
determining the comment string and the at least one predetermined string are not matched when the first parameter and the first index string are not matched;
comparing the second parameter and the second index string to determine whether the second parameter and the second index string are matched when the first parameter and the first index string are matched;
determining the comment string and the at least one predetermined string are not matched when the second parameter and the second index string are not matched;
comparing the third parameter and the third index string to determine whether the third parameter and the third index string are matched when the second parameter and the second index string are matched;
determining the comment string and the at least one predetermined string are not matched when the third parameter and the third index string are not matched;
wherein when the third parameter and the third index string are not matched, the third parameter is not defined and the comment string does not match the predetermined string, and the comment string is not a special string; and
determining the comment string and the at least one predetermined string are matched when the third parameter and the third index string are matched.

4. The event management system of claim 3, wherein the version control server is a Git server and the commit command is a Git commit command corresponding to the Git server.

5. A system, comprising:
at least one client for providing a version control command;
a version control server comprising a processor, wherein the version control server is coupled to the at least one client and configured to perform a version control operation corresponding to the client in response to the version control command sent by the client;
an event management system coupled to the version control server, detecting whether a version control command received from the version control server is a commit command, decoding the commit command to obtain a comment string in response to detecting that the version control command is the commit command and comparing the comment string with at least one predetermined string to determine whether the comment string and the at least one predetermined string are matched and triggering a predetermined event corresponding to the predetermined string in response to determining that the comment string and the at least one predetermined string are matched; wherein the predetermined event at least comprises activating or deactivating at least one control device; and
a database;
wherein the comment string further comprises a first parameter, a second parameter and a third parameter and the predetermined string further includes a first index string, a second index string and a third index string, and the event management system stores the predetermined string in the database by providing a first table, a second table and a third table in the database for storing the first index string, the second index string and the third index string, respectively;
wherein the second index string is connected/linked to the first index string and is a sub-string of the first index string and the third index string is connected/linked to the second index string and is the sub-string of the second index string and the event management system further compares the comment string with the at least one predetermined string to determine whether the comment string and the at least one predetermined string are matched by:
comparing the first parameter and the first index string to determine whether the first parameter and the first index string are matched;
determining the comment string and the at least one predetermined string are not matched when the first parameter and the first index string are not matched;
comparing the second parameter and the second index string to determine whether the second parameter and the second index string are matched when the first parameter and the first index string are matched;
determining the comment string and the at least one predetermined string are not matched when the second parameter and the second index string are not matched;
comparing the third parameter and the third index string to determine whether the third parameter and the third index string are matched when the second parameter and the second index string are matched;
determining the comment string and the at least one predetermined string are not matched when the third parameter and the third index string are not matched;
wherein when the third parameter and the third index string are not matched, the third parameter is not defined and the comment string does not match the predetermined string, and the comment string is not a special string; and determining the comment string and the at least one predetermined string are matched when the third parameter and the third index string are matched.

\* \* \* \* \*